OR  4,027,945

T 3071 H

United States Patent
Iverson

[11] 4,027,945

[45] June 7, 1977

[54] OPTICAL SLIPRINGS

[75] Inventor: Myren L. Iverson, Ridgecrest, Calif.

[73] Assignee: The United States of America as represented by the Secretary of the Navy, Washington, D.C.

[22] Filed: Mar. 4, 1976

[21] Appl. No.: 663,889

[52] U.S. Cl. .............................. 350/96 C; 350/23; 350/96 R

[51] Int. Cl.² .......................................... G02B 5/16

[58] Field of Search ................. 350/96 C, 96 R, 52, 350/23

[56] References Cited

UNITED STATES PATENTS

| | | | |
|---|---|---|---|
| 3,411,011 | 11/1968 | Genahr et al. | 350/96 B |
| 3,922,063 | 11/1975 | Marrone | 350/96 C |
| 3,934,246 | 1/1976 | Mueller | 350/96 B |

Primary Examiner—John K. Corbin
Assistant Examiner—Stewart Levy
Attorney, Agent, or Firm—R. S. Sciascia; Roy Miller; Thomas W. Hennen

[57] ABSTRACT

Optical slip rings are disclosed which permit signals to be transferred from a rotating body to a non-rotating body without any physical contact. Fiber optic bundles are utilized to conduct light signals on one body to separate fiber optic bundles on the other body. Light is projected across a small gap from the rotating bundle to the non-rotating bundle. Other variations use multiple channels, wave guides, derotating prisms and concentric annular mirrors to achieve signal transfer. The optical slip rings can transfer any signal which may be converted to a light signal.

11 Claims, 7 Drawing Figures 4,027,945

1

OPTICAL SLIPRINGS

BACKGROUND OF THE INVENTION

1. Field of the Invention

This invention pertains to apparatus for transferring signals from a rotating body to a non-rotating body. More particularly, this invention pertains to non-contacting optical slip rings which transfer light signals.

2. Description of the Prior Art

Mechanical slip rings for transferring electric current from a rotating body to a non-rotating body are well known in the art. Typically a conducting ring on one body is contacted by one or more conducting brushes on the other body. Electric current flows from one body through the ring to the brush and to the other body. This mechanical arrangement is subject to wear and creates electrical noise which may obscure the signal being transmitted.

SUMMARY OF THE INVENTION

The optical sliprings of this invention have two light carrying members, one attached to a rotating body, and one attached to a non-rotating body. The light carrying members may be bundles of fiber optics which are placed end to end coaxially with the axis of rotation. Light introduced into one bundle travels to the opposite end where it couples across a small gap into the second bundle. Since a gap exists between bundle ends, no physical contact is made. Multichannel bundles may be used where the channels at the coupled ends are each formed into concentric circles separated by opaque material.

Other variations of optical slip rings incorporate a series of fiber optic channels concentrically placed about a wave guide for the transfer of both light signals and microwaves from one body to the other. Still others utilize a derotating prism arranged to rotate at one half the relative rotational speed between the two bodies. The derotating prism so arranged enables focused light from a fixed light source on one body to be transmitted and focused upon a fixed light detector on the other body. Finally, one variation uses concentric annular mirrors within a toroid which has a transparent circumferential window. Light signals from one body are projected through the circumferential window and into the toroid where they rebound until they strike an angled mirror and are deflected out of the toroid. The toroid is attached to one body, and the light projecting means is attached to the other body.

The optical slip rings of this invention have many advantages over mechanical slip rings. There are no mechanical contacts. The separate channels are completely isolated, and because of this complete isolation, ground loops are eliminated. Also, because the light beam is insensitive to RF, there is no RF pickup.

BRIEF DESCRIPTION OF THE DRAWINGS

Further advantages of the present invention will emerge from a description which follows of possible embodiments of optical slip rings according to the invention, given with reference to the accompanying drawing figures, in which.

2

Figure 3:
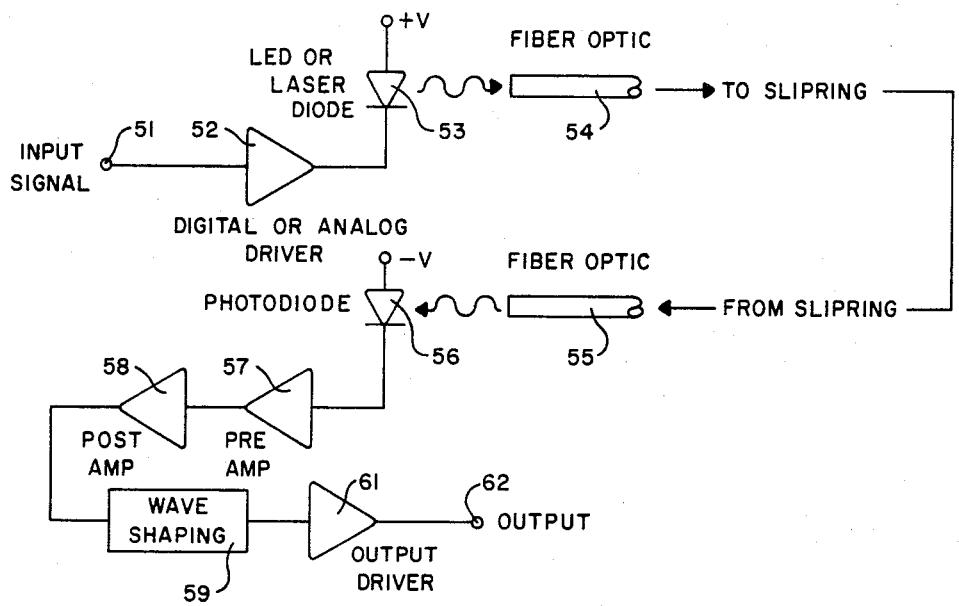
Figure 4:
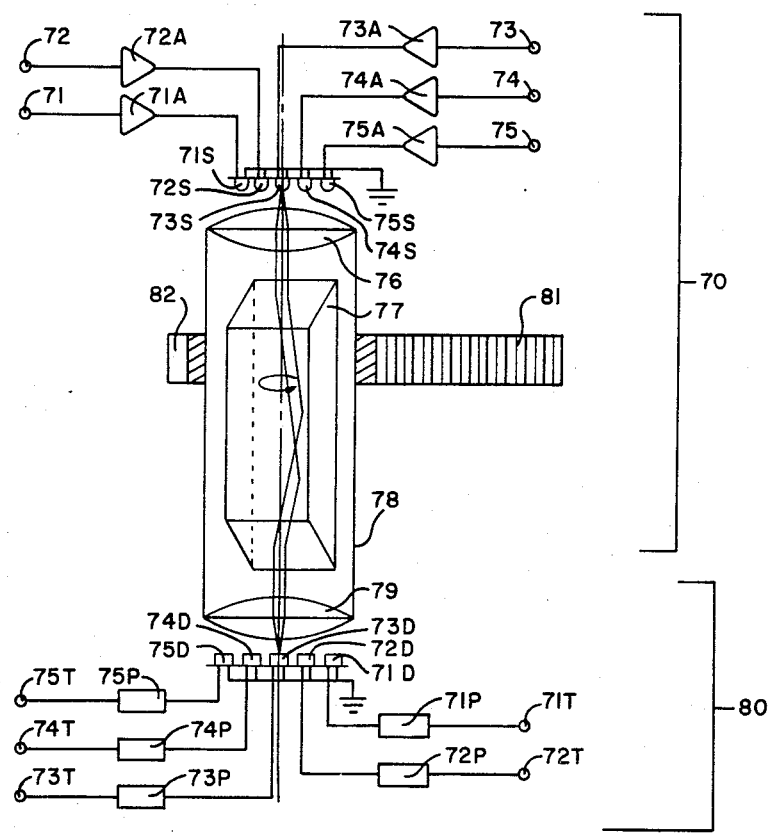
Figure 5:
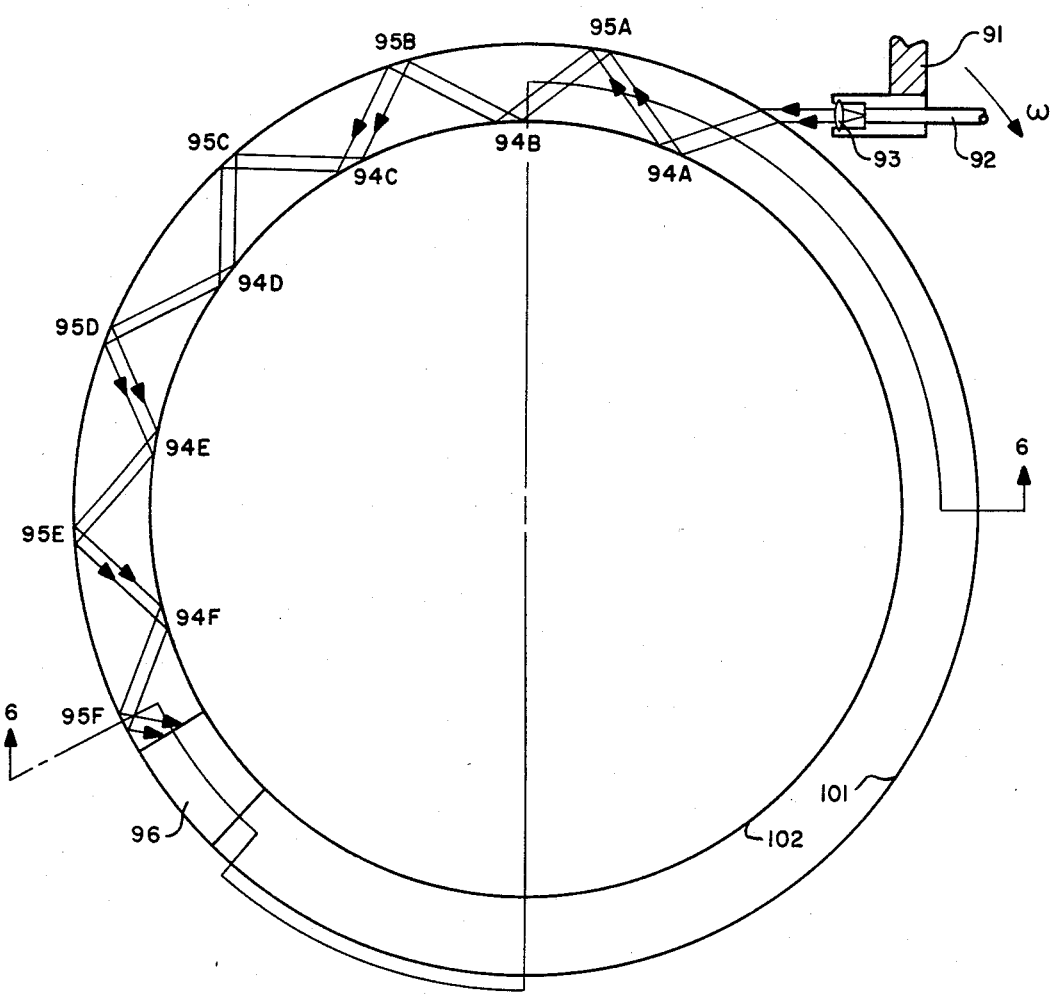
Figure 6:
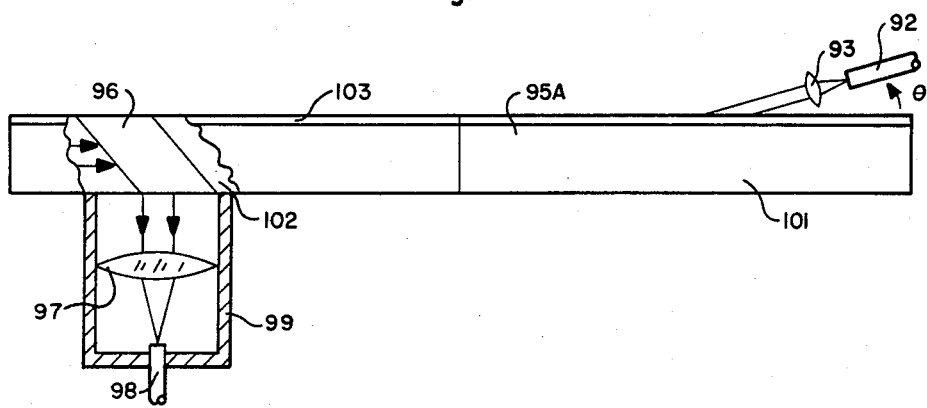

FIG. 3 is a schematic diagram of signal converting apparatus for use with optical slip rings according to the invention;

FIG. 4 is a schematic view of an embodiment of an optical slip ring according to the invention;

FIG. 5 is a schematic plan view, partially in section, of an optical slip ring according to the invention; and FIG. 6 is a view along line 6—6 in FIG. 5.

THE PREFERRED DESCRIPTION OF EMBODIMENTS

The optical slip rings of this invention provide a means for transferring signals to and from the rotating portion of any gimbaled mount, without mechanical connections.

Figure 1A:
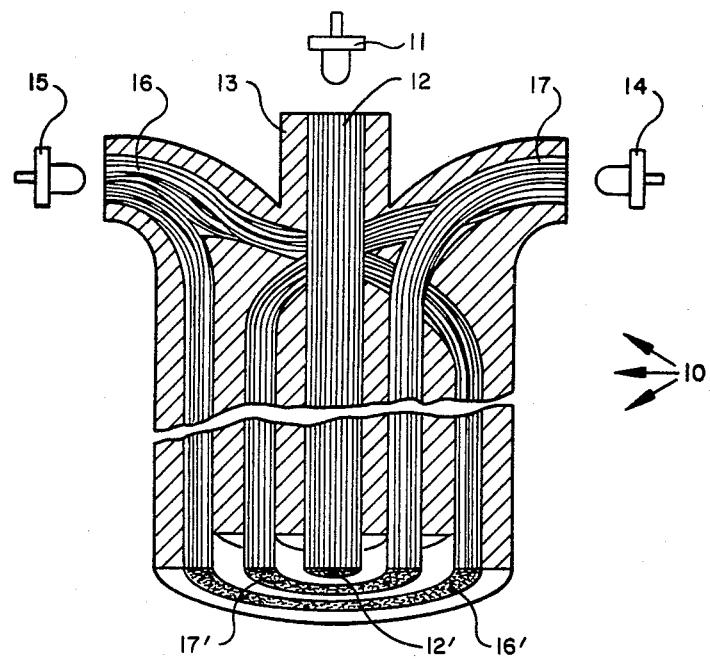
FIGS. 1A and 1B are longitudinal sections of one embodiment of optical slip rings according to the invention.

Referring now to the drawing figures, wherein like reference numerals refer to like parts and elements throughout the several views, there is shown in FIG. 1A, rotating bundle 10. Bundle 10 has three transmitting channels defined by fiber optic bundles 12, 16 and 17 respectively. Each channel is isolated by opaque bundle covering 13 which may be polyvinyl chloride sheathing, or any other opaque material. Similarly, in FIG. 1B, stationary bundle 20 is shown having three corresponding channels defined by fiber optic bundles 22, 26 and 27, and isolated by opaque bundle covering 23.

Rotating bundle 10 is attached to a rotating body, not shown, and bundle end 12' is centered on the axis of rotation. Stationary bundle 20 is attached to a stationary body, not shown, and bundle end 22' is centered on the axis of rotation of the rotating body. Bundle ends 12', 16' and 17' are placed in close noncontacting alignment with bundle ends 22', 26' and 27'. Bundle ends 16' and 17' are concentric to bundle end 12' and bundle ends 26' and 27' are concentric to bundle end 22'. Light from sources 11, 14 and 15, which may be light emitting diodes, laser diodes or other light sources, enters bundles 12, 17 and 16 respectively, and is transmitted to ends 12', 17' and 16'. The light couples across the short distance between bundle 10 and bundle 20, and enters respective bundle ends 22', 27' and 26'. The coupled light then travels to the ends of bundles 22, 27 and 26 adjacent light detectors 21, 24 and 25. Bundle 10 rotates in coaxial alignment to bundle 20 at the coupling junction, and thus light signals are maintained in their respective channels.

Channel separators 28 and 29 may be used to further eliminate crosstalk at the coupling junction of bundles 10 and 20 by shielding the respective bundle ends. Of course, channel separators 28 and 29 could be placed on either bundle 10 or 20, and any other means of preventing light in one channel from entering another channel at the coupling junction could be used.

Figure 1B:
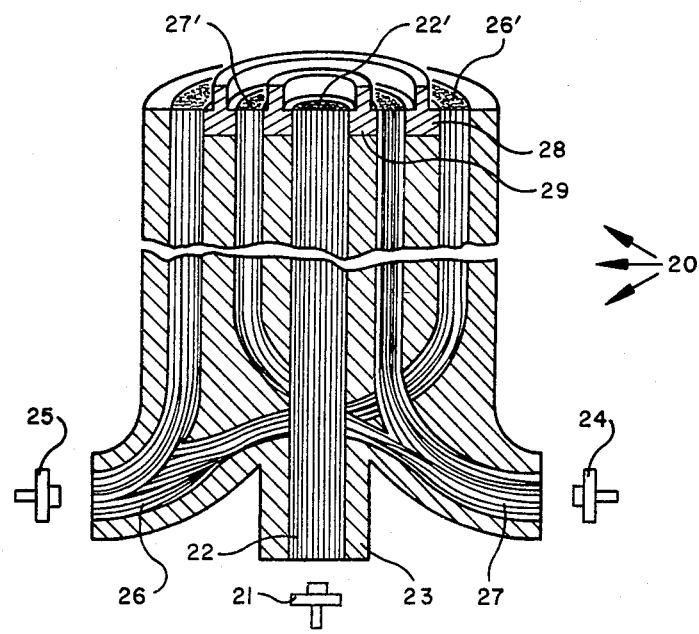

A single channel device, constructed as in FIGS. 1A and 1B, could of course be made. Also one or more light sources and detectors could be interchanged to provide a bidirectional device, or a beam splitter, a source, and a detector could be used at each terminal to simultaneously transmit and receive through each channel.

If desired, more than one light signal could be transmitted through the same channel simultaneously by using a different wavelength for each signal. One way of doing this would be to use a bifurcated fiber optic bundles for both the rotating bundle and the non-rotating bundle. Each branch of the Y shaped input bundle would be adjacent a different wavelength light source, and individual fibers from each input branch would be randomly placed at the coupling end. The output bundle would be constructed in the same manner as the input bundle. At each output branch the intermingled wavelengths would be filtered to pass only the output desired at each branch. Suitable detectors would then respond to the separate outputs at each output branch.

Figure 2:
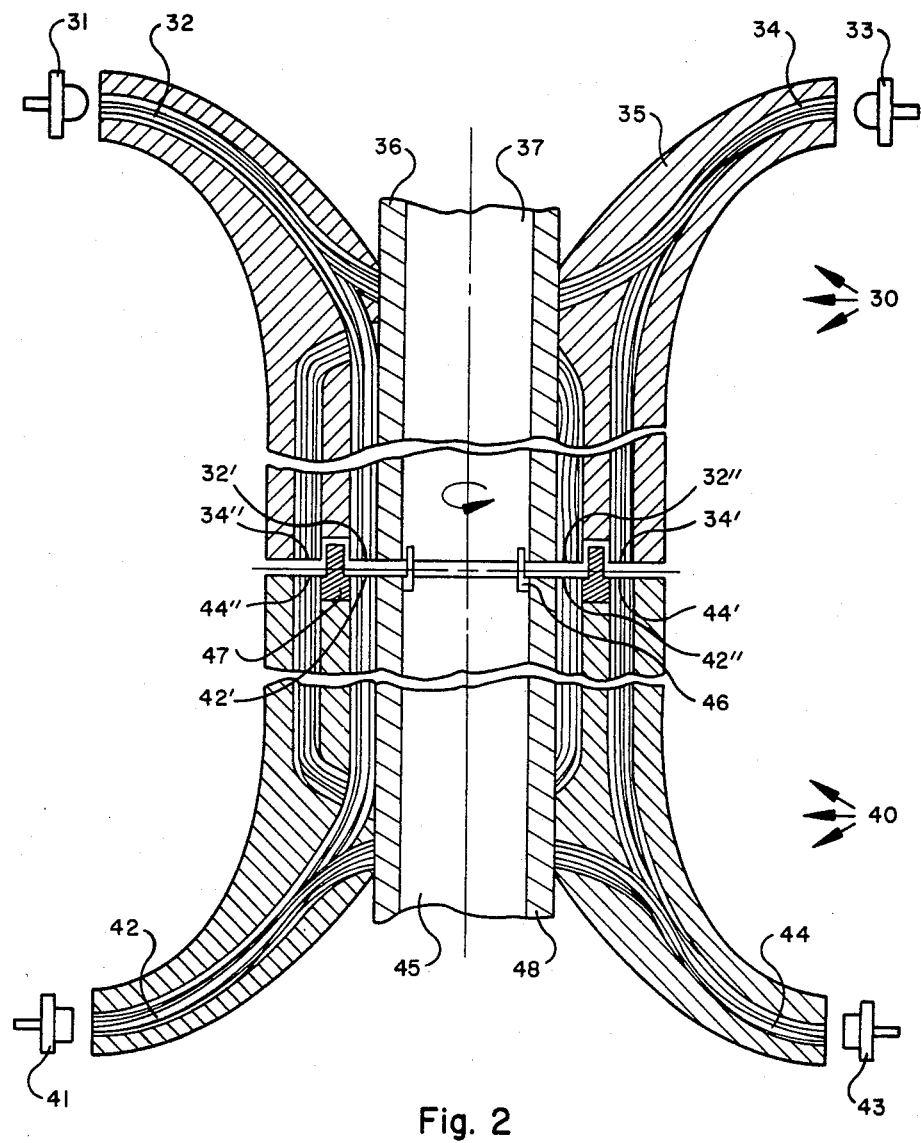
FIG. 2 is a longitudinal section of an embodiment of optical slip rings according to the invention.

FIG. 2 shows an alternate version of an optical slip ring arrangement which includes a central wave guide for transferring microwaves. Rotating portion 30 and stationary portion 40 are constructed similarly to bundles 10 and 20 of FIG. 1A and 1B. Light from sources 31 and 33 enters bundles 32 and 34, and is transmitted to the concentric annular bundle ends at 32', 32'', 34' and 34'' where it couples respectively to the concentric annular bundle ends at 42', 42'', 44' and 44''. Light then transmits through bundles 42 and 44 to detectors 41 and 43. Opaque bundle covering 35 isolates signals in each channel and maintains bundle shape. Wave guide 36 on portion 30 is coaxially aligned with wave guide 48 on portion 40 so that microwaves may be propagate through central bores 37 and 45. A rotary joint 46 maintains concentric alignment of guides 36 and 48.

FIG. 3 is a schematic diagram of typical electronic circuitry which may be used to convert an input signal, which may be in digital, analog, or other form, into a light signal capable of being transmitted by optical slip rings according to this invention. An input signal at 51 is driven by driver 52 and fed to a light emitting diode, laser diode, or other electrically responsive light source 53. Light emitted from source 53 enters fiber optic 54 and passes through the slip ring to fiber optic 55 where it is projected onto a photodiode or other light responsive electric source 56. A signal from source 56 is amplified by preamp 57 and postamp 58, and shaped by element 59. The final wave is driven by output driver 61 to the output terminal 62. Of course, many variations in electronic circuitry could be used, so long as means for producing a light signal for slip ring transmission are provided.

The optical slip ring illustrated in FIG. 4 does not utilize fiber optics, but does use a derotating prism 77 which is arranged within structure 78 to rotate at one half the speed of relative rotation between rotating portion 70 and stationary portion 80. Gears 81 and 82 are sized to achieve this dependent rotation, although any drive arrangement could be used. Prism 77 may be a Dove or Pechan prism or other derotating prism, and should be directionally aligned for transmission as shown in FIG. 4.

The derotating prisms are direct vision prisms which will invert an image in one position, but when turned 90 degrees will revert the image. This property causes an image to rotate at twice the rate that the prism is rotated. If these prisms are rotated at half the speed of a rotating object, its image after passing through the prism, will appear to be stationary. The light passing through the Dove derotating prism 77 must be parallel. The lenses 76 and 79 make the light passing through the prism almost parallel, and also focus the arrays of sources and detectors on each other. The Pechan prism and mirrors can be used the same way, but do not require the light to be parallel.

Electric signals at terminals 71, 72, 73, 74 and 75 are amplified at amplifiers 71A, 72A, 73A, 74A and 75A and fed to light sources 71S, 72S, 73S, 74S and 75S. Light signals from each source are focused by lens 76 and projected into prism 77 where derotation occurs. The signals emerging from prism 77 are again focused by lens 79 to strike the corresponding detector, either 71D, 72D, 73D, 74D or 75D. Electrical signals from each of the detectors are processed by the respective circuits 71P, 72P, 73P, 74P or 75P and delivered to output terminals 71T, 72T, 73T, 74T and 75T.

The derotating prism configuration allows a greater number of channels than may conveniently be obtained with concentric fiber optic bundles, which are practically limited to between three and five channels. The prism system may have some crosstalk, but much of the crosstalk may be eliminated by coating the lenses and prism, and by blackening other surfaces to reduce unwanted reflections.

FIGS. 5 and 6 show a different kind of optical slipring from those discussed thus far. A toroid having a central annular cavity and concentric annular mirrors 101 and 102 is shown. A peripheral transparent window 103 encircles the toroid on one edge of the outer surface as shown in FIG. 6.

Light signals to be transmitted are conducted along fiber optic 92 from rotating body 91 to lens 93. Body 91 is assumed rotating with angular velocity $\omega$, although the slip ring would work as well if body 91 were stationary, or if stationary body 99 were rotating. Light signals are projected by lens 93 through window 103 and strike mirror surface 102 at 94A. Window 103 has an antireflection coating on its outer surface which is selected to match the wavelength of the light source to minimize reflective losses. Other optical elements, such as lenses 93 and 97, may also have antireflective surface coatings. Because the axis of projection of lens 93 is inclined at some angle $\theta$ to the plane of the toroid, the light beams bounding off of mirror surface 102 at 94A strike mirror surface 101 at 95A instead of escaping back through window 103.

The light beams continue to reflect around the inner mirror surfaces 101 and 102 striking them at points 94B, 95B, 94C, 95C, 94D, 95D, 94E, 95E, 94F and 95F until they strike angled mirror 96. Light beams striking mirror 96 are deflected through lens 97 and focused into fiber optic 98.

Angle $\theta$ is chosen so that the light beams can reflect around the entire toroid without dropping below mirror 96, and also so that the first reflected beam striking mirror surface 101, as as 95A, will strike mirror surface 101 below window 103. The projection axis of lens 93 may impinge window 103 from any angular direction as body 91 rotates relative to body 99, and signal coupling between fiber optic 92, and fiber optic 98 is unaffected by the rotational position of one body relative to the other.

Optical slip rings according to this invention have been designed to pass digital data at rates in excess of one million bits per second, and to pass multichannel video transmissions without crosstalk for television signal transmissions. The slip rings may pass digital, analog, or other signals, and bandwidths in excess of 10 megahertz have been achieved. The bandwidth of the optical slip rings is limited mostly by the light emitting diodes and drivers. Appropriate circuitry can be used to drive the light emitting diodes at frequencies in excess of 10 megahertz for enabling the capability of 700 to 1000 lines of resolution for television transmission.

Obviously, many modifications and variations of the present invention are possible in the light of the above teachings. It is therefore to be understood that within the scope of the appended claims, the invention may be practiced otherwise than as specifically described.

What is claimed is:

1. An optical slipring for transferring light signals between a first body and a second body which is fixed for rotation about an axis relative to the first body, comprising:
    a first light carrying member attached to one of said bodies and having a plurality of separate elongated fiber optic input bundles, said elongated fiber optic input bundles being joined to define a plurality of separate optical input terminals and a common projection terminal; and
    a second light carrying member attached to the other body and having a plurality of separate elongated fiber optic output bundles, said elongated fiber optic output bundles being joined to define a common reception terminal and a plurality of separate optical output terminals;
    said projection and reception terminals being maintained in aligned proximity in a confronting relationship, centered about said axis of rotation.

2. An optical slipring as set forth in claim 1 wherein translation means are associated with said first light carrying member for converting electric signals into light signals.

3. An optical slipring as set forth in claim 1 wherein translation means are associated with said second light carrying member for converting light signals into electrical signals.

4. The apparatus of claim 1 wherein said first light carrying member comprises a plurality of separate light carrying channels.

5. The apparatus of claim 1 wherein said second light carrying member comprises a plurality of separate light carrying channels.

6. The apparatus of claim 1 wherein a first wave guide extends from said first body toward said second body along the axis of relative rotation between said bodies, and a second wave guide extends from said second body toward said first body along the axis of relative rotation between said bodies, for transferring waves between said bodies.

7. An optical slipring as set forth in claim 1 wherein said input and output bundles terminate correspondingly at said projection and reception terminals respectively in a central optic channel and at least one annular optic channel which is concentric about said central optic channel, each of said optic channels being separated from an adjacent optic channel by an opaque, optically isolating barrier.

8. An optical slipring as set forth in claim 1 wherein a first waveguide is attached to one of said bodies and extend toward the other body coaxially along said axis of rotation, and a second waveguide is attached to the other body and extends toward said one of said bodies coaxially along said axis of rotation, said input and output bundles terminating at said projection and reception terminals respectively in annular fiber optic bundle ends which concentrically encircle said first and second waveguides respectively, for transferring microwaves and optical signals between said first and second bodies.

9. An optical slipring as set forth in claim 8 wherein a rotary joint connects said first and second waveguided and maintains said first and second waveguides in concentric alignment.

10. An optical slipring as set forth in claim 8 wherein said first and second light carrying members each comprise a plurality of separate, optically isolated light carrying channels.

11. An optical slipring as set forth in claim 10 wherein each of said separate, optically isolated light carrying channels terminates in a separate annular fiber optic bundle end which is concentric about said axis of rotation.

* * * * *